US008811701B2

(12) United States Patent
Khurd et al.

(10) Patent No.: US 8,811,701 B2
(45) Date of Patent: Aug. 19, 2014

(54) SYSTEMS AND METHOD FOR AUTOMATIC PROSTATE LOCALIZATION IN MR IMAGES USING RANDOM WALKER SEGMENTATION INITIALIZED VIA BOOSTED CLASSIFIERS

(75) Inventors: Parmeshwar Khurd, Princeton, NJ (US); Leo Grady, Yardley, PA (US); Ali Kamen, Skillman, NJ (US); Mamadou Diallo, Plainsboro, NJ (US); Kalpitkumar Gajera, Mountain View, CA (US); Peter Gall, Buckenhof (DE); Martin Requardt, Nürnberg (DE); Berthold Kiefer, Erlangen (DE); Clifford R. Weiss, Baltimore, MD (US)

(73) Assignee: Siemens Aktiengesellschaft, Munich (DE)

( * ) Notice: Subject to any disclaimer, the term of this patent is extended or adjusted under 35 U.S.C. 154(b) by 247 days.

(21) Appl. No.: 13/291,615

(22) Filed: Nov. 8, 2011

(65) Prior Publication Data

US 2013/0064439 A1    Mar. 14, 2013

Related U.S. Application Data

(60) Provisional application No. 61/445,587, filed on Feb. 23, 2011.

(51) Int. Cl.
*G06K 9/00* (2006.01)
*G06K 9/34* (2006.01)

(52) U.S. Cl.
USPC ........... 382/128; 382/131; 382/132; 382/173; 382/181

(58) Field of Classification Search
CPC ... G06T 7/0012; G06T 7/0087; G06T 7/0081; G06T 11/003; G06T 2207/20144
See application file for complete search history.

(56) References Cited

U.S. PATENT DOCUMENTS

| | | | | |
|---|---|---|---|---|
| 2009/0161928 | A1* | 6/2009 | Khamene et al. | 382/128 |
| 2010/0098306 | A1* | 4/2010 | Madabhushi et al. | 382/128 |
| 2010/0329529 | A1* | 12/2010 | Feldman et al. | 382/131 |
| 2011/0040169 | A1* | 2/2011 | Kamen et al. | 600/411 |
| 2012/0246181 | A1* | 9/2012 | Nowinski et al. | 707/756 |

OTHER PUBLICATIONS

Zhu, "Prior-based Segmentation of MR Images Using Graph Cuts", Cornell University 2008.*
Betrouni, N., Puech, P., Dewalle, A., Lopes, R., Dubois, P., Vermandel, M.: 3D automatic segmentation and reconstruction of prostate on MR images. In: IEEE EMBS Conf. (2007).
Bishop, C.: Pattern Recognition and Machine Learning. Springer, Heidelberg (2006).

(Continued)

*Primary Examiner* — Amir Alavi
*Assistant Examiner* — Kenny Cese

(57) ABSTRACT

Automatic prostate localization in T2-weighted MR images facilitate labor-intensive cancer imaging techniques. Methods and systems to accurately segment the prostate gland in MR images are provided and address large variations in prostate anatomy and disease, intensity inhomogeneities, and artifacts induced by endorectal coils. A center of the prostate is automatically detected with a boosted classifier trained on intensity based multi-level Gaussian Mixture Model Expectation Maximization (GMM-EM) segmentations of the raw MR images. A shape model is used in conjunction with Multi-Label Random Walker (MLRW) to constrain the seeding process within MLRW.

17 Claims, 6 Drawing Sheets

(56) References Cited

OTHER PUBLICATIONS

Dobkin, D., Kirkpatrick, D.: Determining the separation of preprocessed polyhedral—a unified approach. Automata, Languages and Programming 443, 400-413 (1990).
Flores-Tapia, D., Thomas, G., Venugopal, N., McCurdy, B., Pistorius, S.: Semiautomatic MRI prostate segmentation based on wavelet multiscale products. In: IEEE EMBS Conf. (2008).
Franiel, T., Ludemann, L. Rudolph, B., Rehbein, H., Stephan, C., Taupitz, M., Beyersdorff, D.: Prostate MR imaging: Tissue characterization with pharmacokinetic volume and blood flow parameters and correlation with histologic parameters. Radiology 252(1), 101-108 (2009).
van Ginneken, B., Heimann, T., Styner, M.: 3D segmentation in the clinic: A grand challenge. In: MICCAI Wshp. 3D Segmentation in the Clinic (2007).
Gong, L. Pathak, S., Haynor, D., Cho, P., Kim, Y.: Parametric shape modeling using deformable superellipses for prostate segmentation. TMI 23(3) (2004).
Grady, L.: Random walks for image segmentation. IEEE Pattern Analysis and Machine Intelligence 28(11), 1768-1783 (2006).
Klein, S., van der Heide, U.A., Lips, I., van Vulpen, M., Maes, F., Staring, M., Pluim, J.: Automatic segmentation of the prostate in 3D MR images by atlas matching using localized mutual information. Medical Physics 35(4), 1407-1417 (2008).
Leemput, K.V., Maes, F., Vandermeulen, D., Suetens, P.: Automated model-based bias field correction of MR images of the brain. TMI 18(10), 885-896 (2003).
Liu, X., Langer, D.L., Haider, M.A., der Kwast, T.H.V., Evans, A.J., Wernick, M.N., Yetik, I.S.: Unsupervised segmentation of the prostate using MR images based on level set with a shape prior. In: IEEE EMBS Conf. (2009).
Rousson, M., Khamene, A., Diallo, M.H., Celi, J.C., Sauer, F.: Constrained surface evolutions for prostate and bladder segmentation in CT images. In: Liu, Y., Jiang, T.-Z., Zhang, C. (eds.) CVBIA 2005. LNCS, vol. 3765, pp. 251-260. Springer, Heidelberg (2005).
Samiee, M., Thomas, G., Fazel-Rezai, R.: Semi-automatic prostate segmentation of MR images based on flow orientation. In: IEEE International Symposium on Signal Processing and Information Technology (2006).
Scheenen, T., Heijmink, S., Roell, S., de Kaa, C.H., Knipscheer, B., Witjes, J., Barentsz, J., Heerschap, A.: Three-dimensional proton MR spectroscopy of human prostate at 3 T without endorectal coil. Radiology 245(2), 507-516 (2007).
Toth, R., Chappelow, J., Rosen, M.A., Pungavkar, S., Kalyanpur, A., Madabhushi, A.: Multi-attribute non-initializing texture reconstruction based active shape model (MANTRA). In: Metaxas, D., Axel, L., Fichtinger, G., Székely, G. (eds.) MICCAI 2008, Part I. LNCS, vol. 5241, pp. 653-661. Springer, Heidelberg (2008).
Toth, R., Tiwari, P., Rosen, M., Reed, G., Kurhanewicz, J., Kalyanpur, A., Pungavkar, S., Madabhushi, A.: A magnetic resonance spectroscopy driven initialization scheme for active shape model based prostate segmentation. Medical Image Analysis 15, 214-225 (2011).
Tu, Z., Zhou, X., Barbu, A., Bogoni, L., Comaniciu, D.: Probabilistic 3D polyp detection in CT images: The role of sample alignment. In: CVPR (2006).
Turkbey, B., Pinto, P., Choyke, P.L.: Imaging techniques for prostate cancer: implications for focal therapy. Nature Reviews: Urology 6, 191-203 (2009).
Viola, P., Jones, M.: Robust real-time face detection. In J. Comp. Vision 57(2), 137-154 (2004).
D. Singaraju, L. Grady and R. Vidal, Interactive Image Segmentation Via Minimization of Quadratic Energies on Directed Graph, Proc. IEEE Conf. on Computer Vision and Pattern Recognition, Jun. 2008.
Tsai, A., Yezzi, A., Wells, W., Tempany, C., Tucker, D., Fan, A., Grimson, W., Willsky, A.: A shape-based approach to the segmentation of medical imagery using level sets. TMI 22(2), 137-154 (2003).

\* cited by examiner

SYSTEMS AND METHOD FOR AUTOMATIC PROSTATE LOCALIZATION IN MR IMAGES USING RANDOM WALKER SEGMENTATION INITIALIZED VIA BOOSTED CLASSIFIERS

CROSS-REFERENCE TO RELATED APPLICATIONS

This application claims the benefit of U.S. Provisional Application No. 61/445,587, filed Feb. 23, 2011, which is incorporated herein by reference.

BACKGROUND OF THE INVENTION

The present invention relates to methods and systems for automatic prostate localization. More specifically, it is related to automatic prostate localization using random walker segmentation initialized via boosted classifiers.

Accurate prostate segmentation in MR imagery poses unique challenges. These challenges include large variations in prostate anatomy and disease, intensity inhomogeneities, and near-field artifacts mainly induced by endorectal (ER) coils which cause accuracy problems in including the peripheral zone (PZ) of the prostate within the overall segmentation.

Accordingly, novel and improved systems and methods in automatic prostate segmentation are required.

SUMMARY OF THE INVENTION

Novel methods and systems are provided herein as an aspect of the present invention for automatic segmentation of the prostate gland in MR images. The systems and methods provided herein in accordance with various aspects of the present invention meet challenges in prostate segmentation posed by large variations in prostate anatomy and disease, intensity inhomogeneities, and near-field artifacts induced by endorectal coils with at least two components.

A first component provided in accordance with an aspect of the present invention is an automatic center detection of the prostate with a boosted classifier trained on intensity based multi-level Gaussian Mixture Model Expectation Maximization (GMM-EM) segmentations of the raw MR images.

A second component provided in accordance with an aspect of the present invention is the use of a shape model in conjunction with Multi-Label Random Walker (MLRW) to constrain the seeding process within MLRW.

In accordance with an aspect of the present invention a method is provided for segmenting a prostate in Magnetic Resonance Image (MRI) data, comprising a processor learning a boosting classifier from a plurality of Magnetic Resonance (MR) images, the processor determining a center of the prostate by applying the boosting classifier, the processor applying an intensity correction to suppress an image artifact, the processor determining a foreground seed and a background seed of the prostate based on a shape model of the prostate and the processor applying a segmentation method to the image data based on the foreground and background seed to generate a segmentation of the prostate.

In accordance with a further aspect of the present invention a method is provided, wherein the segmentation method is a Random Walker segmentation.

In accordance with yet a further aspect of the present invention a method is provided, further comprising the processor determining a probability threshold for the Random Walker segmentation that maximizes a capture of a peripheral zone (PZ) in the segmentation of the prostate.

In accordance with yet a further aspect of the present invention a method is provided, wherein the boosted classifier is trained on intensity-based multi-level Gaussian Mixture Model Expectation Maximization (GMM-EM) segmentations of MR images of a prostate.

In accordance with yet a further aspect of the present invention a method is provided, further comprising the processor determining a signed distance map as a mean prostate shape from a plurality of prostate images.

In accordance with yet a further aspect of the present invention a method is provided, wherein the foreground seed and the background seed are determined based on a GMM-EM segmentation of left and right prostate muscles and a rectum.

In accordance with yet a further aspect of the present invention a method is provided, wherein the image artifact is created by an endorectal (ER) coil.

In accordance with yet a further aspect of the present invention a method is provided, wherein the intensity correction is an intensity transformation of a high-intensity cluster by the processor.

In accordance with a further aspect of the present invention a method is provided, wherein the intensity transformation is expressed as $$v_{new} = \mu_m + \epsilon + \frac{\sigma_m}{\sigma_h}(v_{old} - \mu_h),$$

wherein $v_{new}$ a corrected intensity of a voxel, $v_{old}$ is an uncorrected intensity of a voxel, $\mu_m$ is a middle-intensity mean, $\epsilon$ is an arbitrary constant, $\sigma_m$ is a standard deviation of a middle-intensity component, $\sigma_h$ is a standard deviation of a high-intensity component $\mu_h$ is a high-intensity mean.

In accordance with yet a further aspect of the present invention a method is provided, wherein the threshold for the Random Walker segmentation is determined from a maximum in a normalized flux.

In accordance with another aspect of the present invention a system is provided, to segment a prostate in Magnetic Resonance Image (MRI) data, comprising memory enabled to store data, a processor enabled to execute instructions to perform the steps learning a boosting classifier from a plurality of Magnetic Resonance (MR) images, determining a center of the prostate by applying the boosting classifier, applying an intensity correction to suppress an image artifact, determining a foreground seed and a background seed of the prostate based on a shape model of the prostate and applying a segmentation method to the image data based on the foreground and background seed to generate a segmentation of the prostate.

In accordance with yet another aspect of the present invention a system is provided, wherein the segmentation method is a Random Walker segmentation.

In accordance with yet another aspect of the present invention a system is provided, further comprising the processor being enabled to determine a probability threshold for the Random Walker segmentation that maximizes a capture of a peripheral zone (PZ) in the segmentation of the prostate.

In accordance with yet another aspect of the present invention a system is provided, wherein the boosted classifier is trained on intensity corrected Magnetic Resonance (MR) images of a prostate.

In accordance with yet another aspect of the present invention a system is provided, further comprising the processor being enabled to determine a signed distance map as a mean prostate shape from a plurality of prostate images.

In accordance with yet another aspect of the present invention a system is provided, wherein the foreground seed and the background seed are determined based on a GMM-EM segmentation of left and right prostate muscles and a rectum.

In accordance with yet another aspect of the present invention a system is provided, wherein the image artifact is created by an endorectal (ER) coil.

In accordance with yet another aspect of the present invention a system is provided, wherein the intensity correction is an intensity transformation of a high-intensity cluster by the processor.

In accordance with yet another aspect of the present invention a system is provided, wherein the intensity transformation is expressed as $$v_{new} = \mu_m + \epsilon + \frac{\sigma_m}{\sigma_h}(v_{old} - \mu_h),$$

wherein $v_{new}$ is a corrected intensity of a voxel, $v_{old}$ is an uncorrected intensity of a voxel, $\mu_m$ is a middle-intensity mean, $\epsilon$ is an arbitrary constant, $\sigma_m$ is a standard deviation of a middle-intensity component, $\sigma_h$ is a standard deviation of a high-intensity component and $\mu_h$ is a high-intensity mean.

In accordance with yet another aspect of the present invention a system is provided, wherein the threshold for the Random Walker segmentation is determined from a maximum in a normalized flux.

Another aspect of the present invention contemplates a system to determine . . . . The system includes a memory, enabled to store the first set of data, the second set of data and instructions. It also includes a processor, enabled to retrieve instructions from the memory to any of the above steps or any other step described herein.

DETAILED DESCRIPTION

MRI plays a key role in the diagnosis, staging and treatment monitoring for prostate cancer. Various MR modalities such as T2 MRI using endorectal (ER) coils, dynamic contrast enhanced (DCE) MRI, diffusion-weighted imaging and 3D chemical shift spectroscopy imaging contribute complementary forms of information during these processes, as described in for instance "[19] Turkbey, B., Pinto, P., Choyke, P. L.: Imaging techniques for prostate cancer: implications for focal therapy. Nature Reviews: Urology 6, 191-203 (2009)."

Prostate localization is a pre-requisite for optimal positioning of radio-frequency (RF) saturation bands to prevent fat contamination in 3D MR chemical shift spectroscopy as described in [14] Scheenen, T., Heijmink, S., Roell, S., de Kaa, C. H., Knipscheer, B., Witjes, J., Barentsz, J., Heerschap, A.: Three-dimensional proton MR spectroscopy of human prostate at 3 T without endorectal coil. Radiology 245(2), 507-516 (2007)" by fat surrounding the prostate. Automatic prostate localization is thus an important enabler for medical applications, making efforts significantly less labor-intensive.

It is preferable to pre-segment the prostate from T2 images since they are "workhorse" images for prostate cancer as described in "[19] Turkbey, B., Pinto, P., Choyke, P. L.: Imaging techniques for prostate cancer: implications for focal therapy. Nature Reviews: Urology 6, 191-203 (2009)" and clearly show the zonal anatomy and the cancerous tumors.

Automatic segmentation of the prostate gland in medical images is an especially challenging task on account of the large anatomical variability observed across patients and the wide range of pathologies affecting this gland, e.g., benign prostatic hyperplasia, prostate cancer and chronic prostatitis as described in "[5] Franiel, T., Ludemann, L., Rudolph, B., Rehbein, H., Stephan, C., Taupitz, M., Beyersdorff, D.: Prostate MR imaging: Tissue characterization with pharmacokinetic volume and blood flow parameters and correlation with histologic parameters. Radiology 252(1), 101-108 (2009)."

This problem is compounded in MR images on account of the intensity inhomogeneity artifacts and the near-field artifacts induced by the occasional use of ER coils. The latter causes accuracy problems in including the peripheral zone (PZ) of the prostate within the overall segmentation. Since the PZ is widely affected by prostate pathologies, it is important in medical diagnosis and it must be included within the segmentation.

Figure 1:
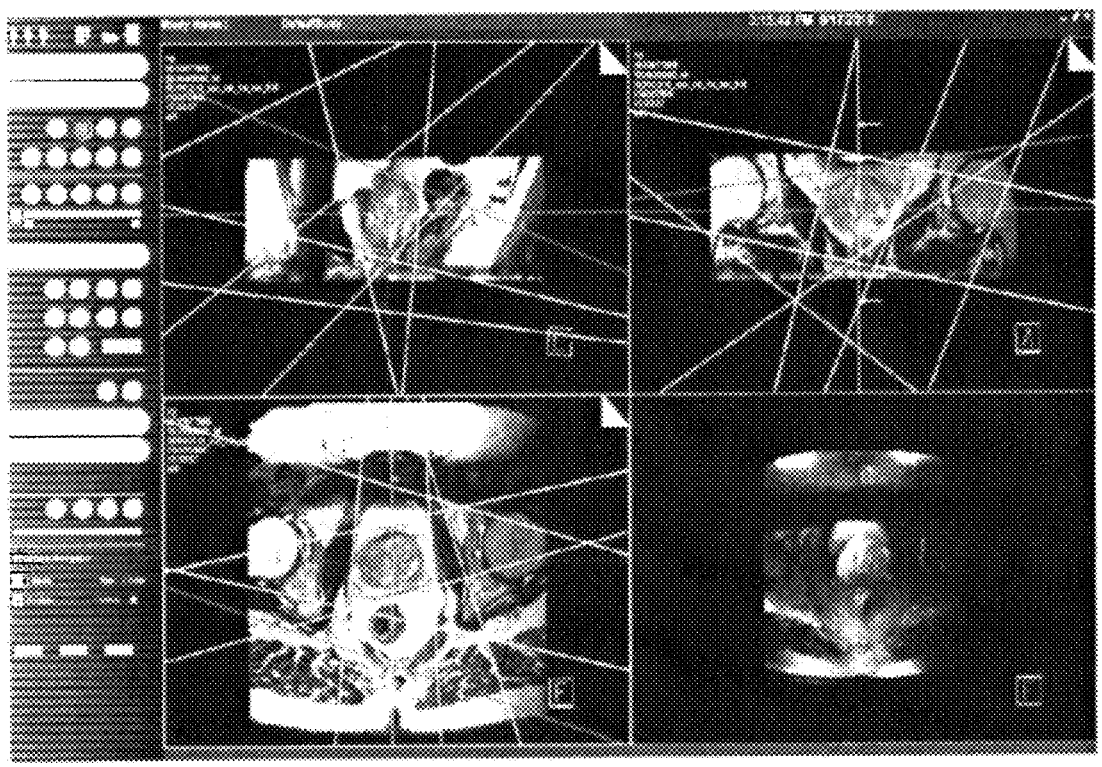
FIG. 1 illustrates a segmentation of a prostate in medical image data.

The methods provided herein in accordance with an aspect of the present invention address the above challenges by applying several innovations described below. A typical result for the positioning of the RF saturation bands is displayed for illustrative purposes in FIG. 1 which shows typical prostate segmentation output with computation of saturation bands for spectroscopic imaging.

Further below, systems and methods provided with various aspects of the present invention will be described in detail and used to segment non-isotropic T2-TSE and T2-SPACE images.

The prostate segmentation problem in CT and ultrasound images has received a lot of attention, for instance in [12]. Rousson, M., Khamene, A., Diallo, M. H., Celi, J. C., Sauer, F.: Constrained surface evolutions for prostate and bladder segmentation in CT images. In: Liu, Y., Jiang, T.-Z., Zhang, C. (eds.) CVBIA 2005. LNCS, vol. 3765, pp. 251-260. Springer, Heidelberg (2005)" and "[7]. Gong, L., Pathak, S., Haynor, D., Cho, P., Kim, Y.: Parametric shape modeling using deformable superellipses for prostate segmentation. TMI 23(3) (2004)", but the MR prostate segmentation problem poses some unique problems as noted earlier, some of which have been addressed in [15]. Toth, R., Chappelow, J., Rosen, M. A., Pungavkar, S., Kalyanpur, A., Madabhushi, A.: Multi-attribute non-initializing texture reconstruction based active shape model (MANTRA). In: Metaxas, D., Axel, L., Fichtinger, G., Székely, G. (eds.) MICCAI 2008, Part I. LNCS, vol. 5241, pp. 653-661. Springer, Heidelberg (2008)," "[16]. Toth, R., Tiwari, P., Rosen, M., Reed, G., Kurhanewicz, J., Kalyanpur, A., Pungavkar, S., Madabhushi, A.: A magnetic resonance spectroscopy driven initialization scheme for active shape model based prostate segmentation. Medical Image Analysis 15, 214-225 (2011)," "[11]. Liu, X., Langer, D. L., Haider, M. A., der Kwast, T. H. V., Evans, A. J., Wernick, M. N., Yetik, I. S.: Unsupervised segmentation of the prostate using MR images based on level set with a shape prior. In: IEEE EMBS Conf. (2009)," [13]. Samiee, M., Thomas, G., Fazel-Rezai, R.: Semi-automatic prostate segmentation of MR images based on flow orientation. In: IEEE International Symposium on Signal Processing and Information Technology (2006)," [4]. Flores-Tapia, D., Thomas, G., Venugopal, N., McCurdy, B., Pistorius, S.: Semiautomatic MRI prostate segmentation based on wavelet multiscale products. In: IEEE EMBS Conf. (2008), "[1]. Betrouni, N., Puech, P., Dewalle, A., Lopes, R., Dubois, P., Vermandel, M.: 3D automatic segmentation and reconstruction of prostate on MR images. In: IEEE EMBS Conf. (2007), "[17]. Tsai, A., Yezzi, A., Wells, W., Tempany, C., Tucker, D., Fan, A., Grimson, W., Willsky, A.: A shape-based approach to the segmentation of medical imagery using level sets. TMI 22(2), 137-154 (2003)" and "[9]. Klein, S., van der Heide, U. A., Lips, I., van Vulpen, M., Maes, F., Staring, M., Pluim, J.: Automatic segmentation of the prostate in 3D MR images by atlas matching using localized mutual information. Medical Physics 35(4), 1407-1417 (2008)." However, "[11]. Liu, X., Langer, D. L., Haider, M. A., der Kwast, T. H. V., Evans, A. J., Wernick, M. N., Yetik, I. S.: Unsupervised segmentation of the prostate using MR images based on level set with a shape prior. In: IEEE EMBS Conf. (2009)," [13]. Samiee, M., Thomas, G., Fazel-Rezai, R.: Semi-automatic prostate segmentation of MR images based on flow orientation. In: MEE International Symposium on Signal Processing and Information Technology (2006)," [4]. Flores-Tapia, D., Thomas, G., Venugopal, N., McCurdy, B., Pistorius, S.: Semiautomatic MRI prostate segmentation based on wavelet multiscale products. In: IEEE EMBS Conf. (2008)" and "[1]. Betrouni, N., Puech, P., Dewalle, A., Lopes, R., Dubois, P., Vermandel, M.: 3D automatic segmentation and reconstruction of prostate on MR images. In: IEEE EMBS Conf. (2007)" only provide anecdotal results and do not include an evaluation on a database of images, whereas "[15]. Toth, R., Chappelo, J., Rosen, M. A., Pungavkar, S., Kalyanpur, A., Madabhushi, A.: Multi-attribute non-initializing texture reconstruction based active shape model (MANTRA). In: Metaxas, D., Axel, L., Fichtinger, G., Székely, G. (eds.) MICCAI 2008, Part I. LNCS, vol. 5241, pp. 653-661. Springer, Heidelberg (2008)" and "[16]. Toth, R., Tiwari, P., Rosen, M., Reed, G., Kurhanewicz, J., Kalyanpur, A., Pungavkar, S., Madabhushi, A.: A magnetic resonance spectroscopy driven initialization scheme for active shape model based prostate segmentation. Medical Image Analysis 15, 214-225 (2011)" evaluate their technique on 2D slices and "[16]. Toth, R., Tiwari, P., Rosen, M., Reed, G., Kurhanewicz, J., Kalyanpur, A., Pungavkar, S., Madabhushi, A.: A magnetic resonance spectroscopy driven initialization scheme for active shape model based prostate segmentation. Medical Image Analysis 15, 214-225 (2011)" uses 3D spectroscopy to initialize segmentation on T2 images. Moreover, none of these methods address the unique problems (related to the PZ and the ER coil) addressed herein. The work in "[17]. Tsai, A., Yezzi, A., Wells, W., Tempany, C., Tucker, D., Fan, A., Grimson, W., Willsky, A.: A shape-based approach to the segmentation of medical imagery using level sets. TMI 22(2), 137-154 (2003)" uses T1 images and it is not clear if they capture the PZ. They also show anecdotal results and do not report error metrics on their database.

More importantly, it is noted that unlike previous studies on MR prostate segmentation, the problem as addressed herein is extremely challenging because apart from the various pathologies affecting the patient data, it was obtained via different acquisition protocols from multiple clinical sites using variable scan parameters. The frequent use of ER coils increased prostate shape variability. Systems as provided herein in accordance with one or more aspects of the present invention are believed to provide the only 3D segmentation methods capable of dealing with all this variability, while capturing the peripheral zone.

The 3D atlas-based segmentation method developed in "[9]. Klein, S., van der Heide, U. A., Lips, I., van Vulpen, M., Maes, F., Staring, M., Pluim, J.: Automatic segmentation of the prostate in 3D MR images by atlas matching using localized mutual information. Medical Physics 35(4), 1407-1417 (2008)" does capture the PZ, but the authors only work with data obtained from a single clinical site using identical optimized scan parameters. Note also that the method in that reference includes the seminal vesicles within the prostate segmentation, whereas they are excluded in methods provided herein in accordance with one or more aspects of the present invention.

A flow of steps that are part of a method provided in accordance with an aspect of the present invention is illustrated in FIG. 2 and contains the following steps:

(A) Centering is a first step with sub-steps as illustrated in box 201 of FIG. 2. Find the center of the prostate gland with a boosted classifier as described in "[20]. Viola, P., Jones, M.: Robust real-time face detection. Int. J. Comp. Vision 57(2), 137-154 (2004)" trained on intensity-based multi-level GMM-EM segmentations of the raw MR images, thus rendering the center-point localization robust to intensity changes both within and across patients. If a rough point close to the center of the prostate gland is already available to the segmentation, then it is used to limit the search range of the boosted classifier. In case the boosted classifier encounters a prostate shape or appearance significantly different from one encountered during training and reports a very low detection probability, then the method uses the rough center to bias the location of the detected center towards it.

Figure 2A:
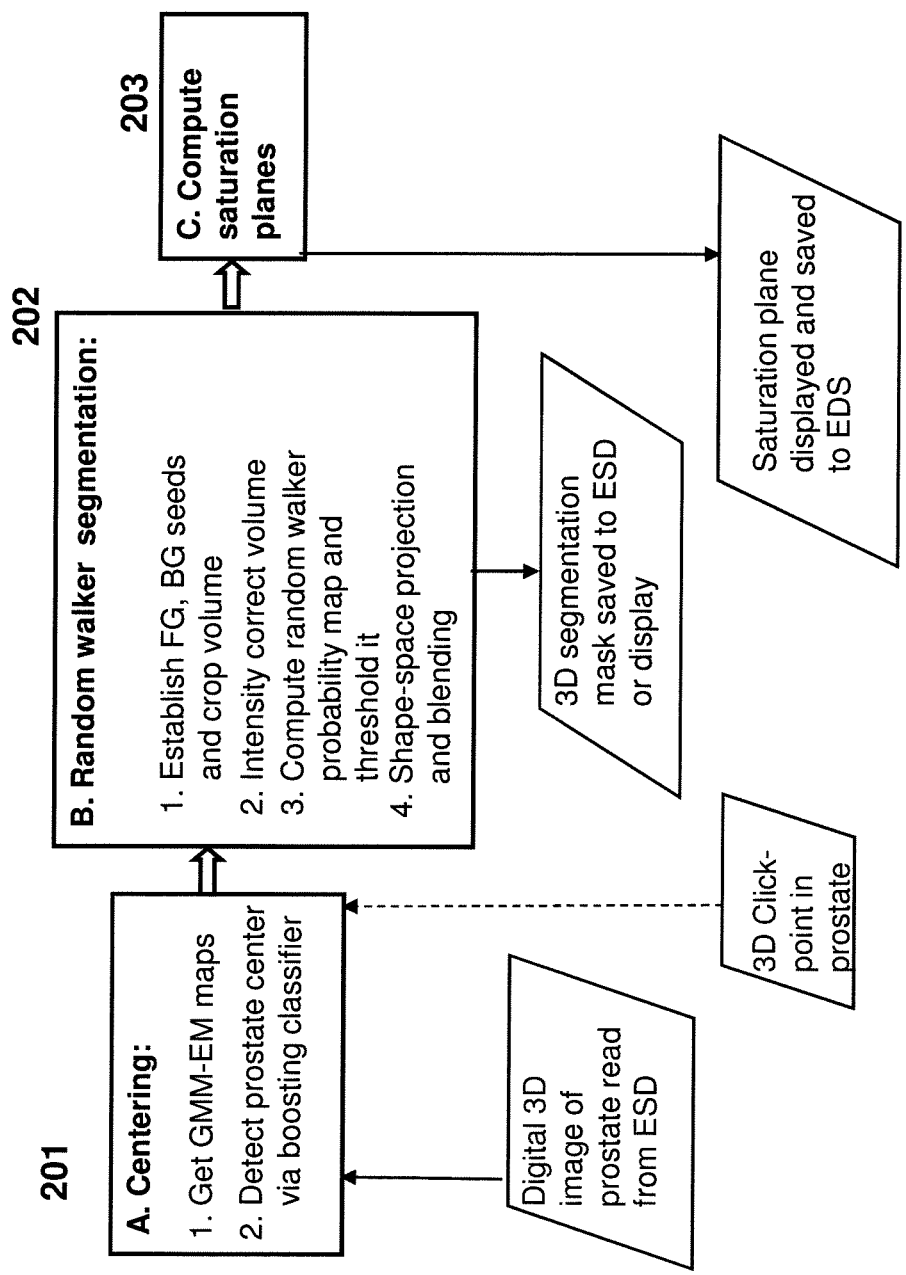
FIGS. 2A and 2B illustrate a flow diagram of steps performed in accordance with various aspects of the present invention.

(B) Perform Random Walker (RW) Segmentation as illustrated in box 202 of FIG. 2A, including the steps: (1) Use a shape model guided by prostate muscle and rectum detectors to initialize the foreground (FG) and background (BG) seeds for the RW segmentation algorithm [8]. The muscle and rectum boundaries are detected from the GMM-EM segmentation as described below. (2) Prior to the use of the RW algorithm, a novel intensity correction technique is used to deal with the nearfield artifacts induced by ER coils. (3) In order to detect the peripheral zone of the prostate gland, a novel technique was devised for computing the threshold of the RW probability map. (4) As a post-processing step for smoothing the RW segmentation, a shape-space projection and blending step is performed.

(C) Compute saturation planes as illustrated in box 203 of FIG. 2. A processor in this step computes the saturation planes of the MR images. The term "saturation planes" is used herein as being a known term in the art. A "saturation plane" is also referred to in the art as "suppression plane."

TrueFISP Acquisitions

Figure 2B:
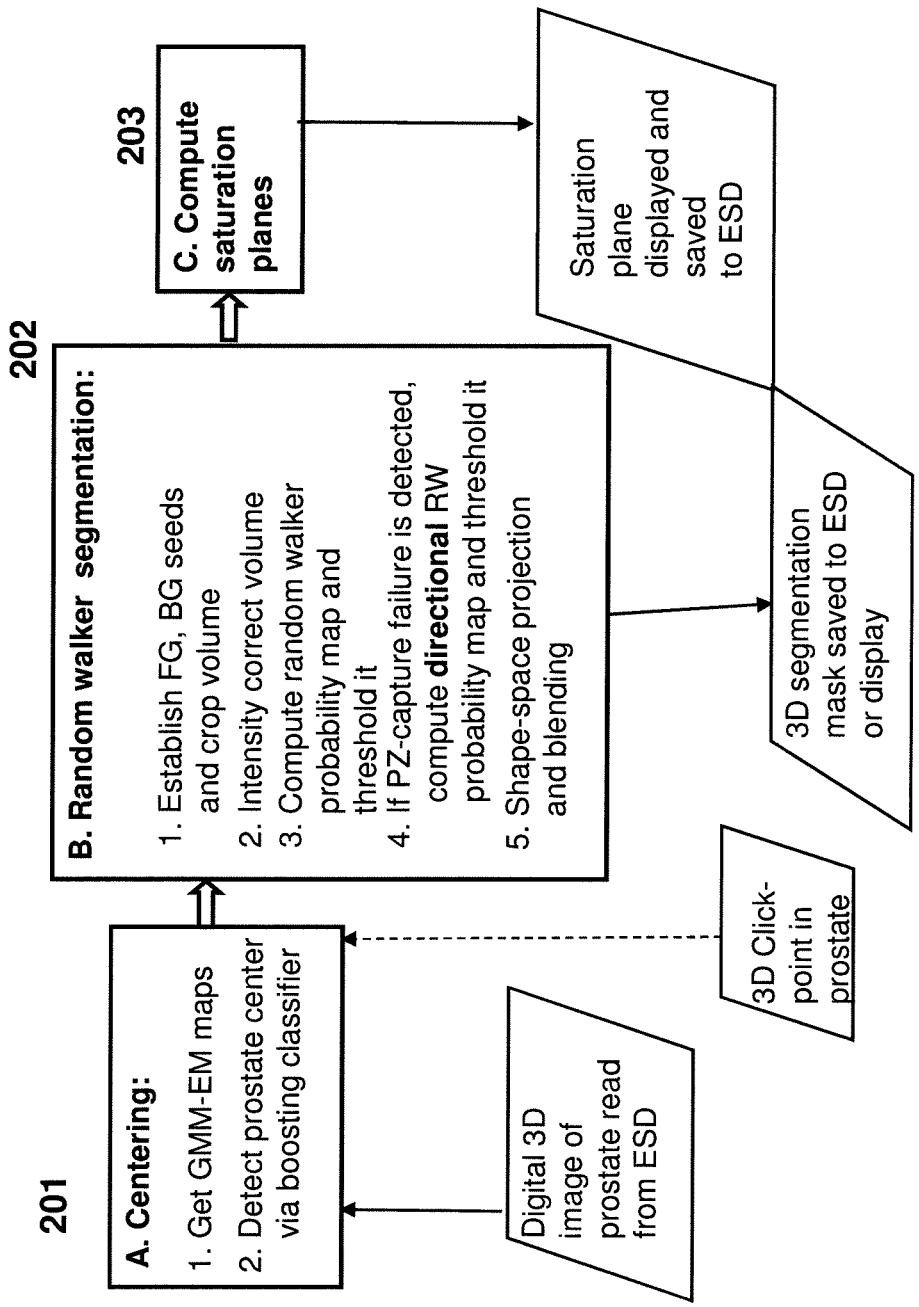

In accordance with an aspect of the present invention, a modified version of the previously described algorithm for T2-SPACE images for TrueFISP (Fast Imaging with Steady-state Precision) acquisitions is used because the ER-artifacts can be more severe in these sequences, resulting in missing parts of the PZ within the prostate segmentation. This is illustrated in FIG. 2B which differs from FIG. 2A by a new step 4 in case of a PZ-capture failure.

Additionally, one can take advantage of the fact that fat around the prostate does not appear to be bright in TrueFISP acquisitions. In accordance with an aspect of the present invention first the previously described algorithm for T2-SPACE images is tried, and if the bright PZ at the bottom is missed, the system switches to the iterative directional RW algorithm to capture the PZ, where the dark-to-bright transitions are ignored by assigning them very high similarity (unity) weights. Note that the dark-to-bright transitions near the bladder still receive low similarity weights. The iterative directional RW algorithm is described in "[21] D. Singaraju, L. Grady and R. Vidal, Interactive Image Segmentation Via Minimization of Quadratic Energies on Directed Graph, Proc. IEEE Conf. on Computer Vision and Pattern Recognition, June, 2008." In one embodiment of the present invention 3 RW iterations are used and the directional RW probability is provided with a threshold by picking the maximum of the product normalized flux and the prostate volume. This concludes the description of the step in case a PZ-capture failure occurs.

It is noted that preferably a Random Walker Segmentation with a computed probability map and computed threshold is used as a segmentation method on the prostate of which a centroid is determined, an intensity is corrected and FG and FB seeds are determined. However, other known segmentations can also be applied to segment the intensity corrected prostate with FG and BG seeds.

Next, components that are an aspect of the present invention are described in detail.

Multi-Level GMM-EM Intensity Clustering

The known GMM-EM algorithm as described in "[2]. Bishop, C.: Pattern Recognition and Machine Learning. Springer, Heidelberg (2006)" is a clustering algorithm that can identify and fit Gaussian clusters within a sample dataset. In accordance with an aspect of the present invention the EM method is initialized using the output of k-means clustering, which in turn is initialized using a set of randomly selected samples as cluster centers (The same random seed is used to guarantee reproducible results although only extremely minimal dependence has been observed of the GMM-EM clustering output on this initialization in separate experiments on a MR database presented further below).

Variants of this GMM-EM algorithm have been routinely used in MR brain intensity segmentation to label 3 components: cerebrospinal fluid, white matter and gray matter as described in "[10]. Leemput, K. V., Maes, F., Vandermeulen, D., Suetens, P.: Automated model-based bias field correction of MR images of the brain. TMI 18(10), 885-896 (2003)."

Figure 3:
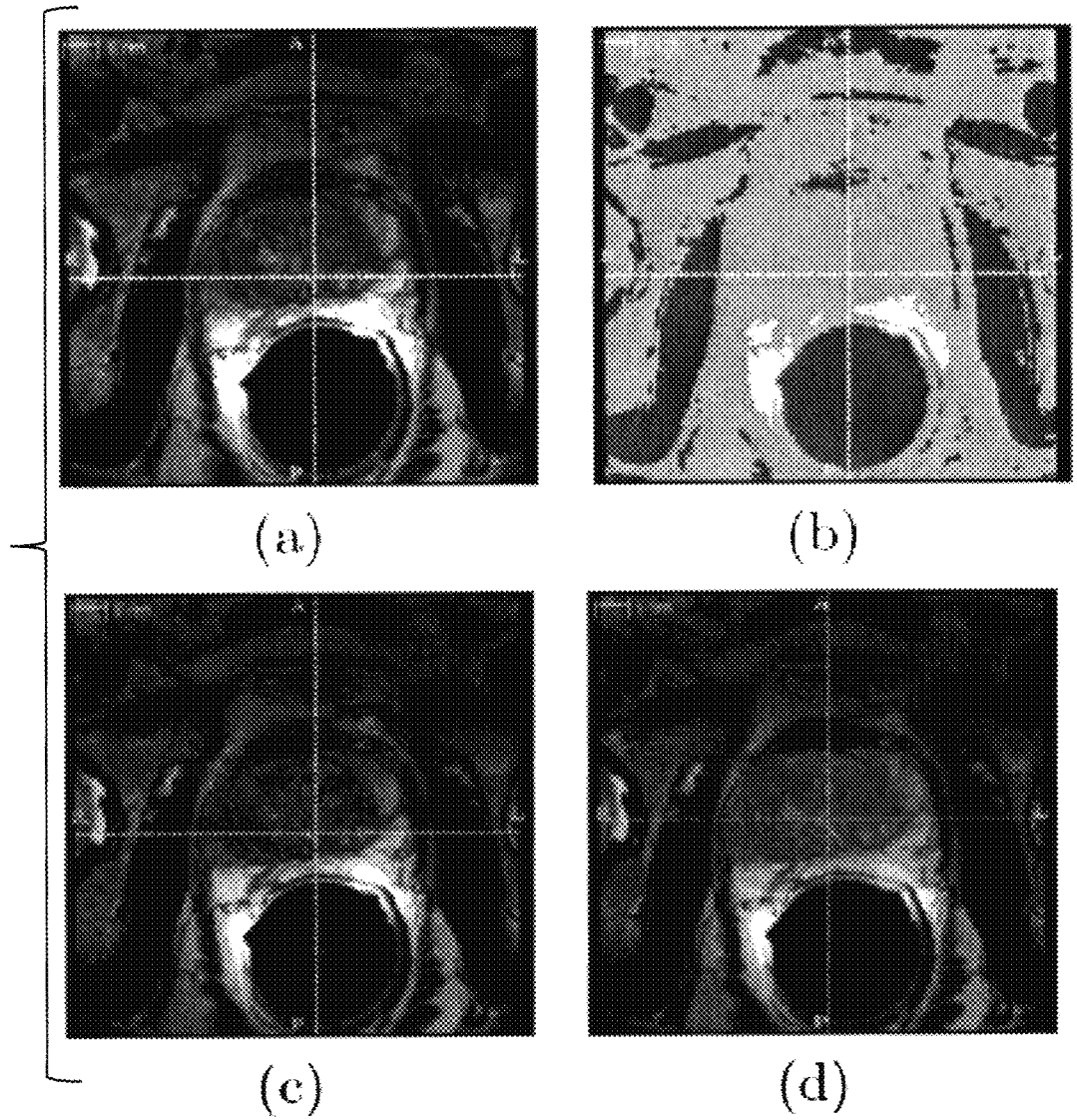
FIG. 3 illustrates prostate segmentation in accordance with at least one aspect of the present invention.

An example of 3-intensity GMM-EM prostate MR segmentation is shown in FIG. 3. FIG. 3(a) illustrates a Raw image, FIG. 3(b) illustrates 3-component segmentation with left/right muscles and rectum in low-intensity cluster and ER-voxels in high-intensity cluster, FIG. 3(c) illustrates an intensity corrected image input to the RW step, and FIG. 3(d) illustrates final shape-constrained segmentation output. As illustrated in FIG. 3, the 3 components are referred to as the low-intensity, middle-intensity and high-intensity clusters. However, unlike with the brain GMM-EM is not necessarily used to identify meaningful regions in a prostate.

GMM-EM serves three purposes in a system that is an aspect of the present invention. Firstly, it reduces the effects of intensity inhomogeneities across patients in order to train a classifier that is provided in accordance with an aspect of the present invention below. Second, it helps in identifying the boundaries for the left and right prostate muscles and the rectum as explained below. Thirdly, it identifies the high-intensity voxels affected by the ER coil as explained below.

Boosted Hierarchical Classifiers with Haar Features

Boosting is a classification technique that linearly combines a series of weak classifier outputs in order to obtain a strong classifier. A boosting classifier in accordance with an aspect of the present invention is used in a sliding-window fashion as described in "[20]. Viola, P., Jones, M.: Robust real-time face detection. Int. J. Comp. Vision 57(2), 137-154 (2004)" in order to locate the center of the prostate gland. Weak classifiers used in an embodiment of the present invention are decision stumps, each trained on a Haar-like feature computed from the 3-component intensity segmentation maps obtained with the GMM-EM algorithm as described earlier.

In one embodiment of the present invention a set of 3D Haar-like features defined in "[18]. Tu, Z., Zhou, X., Barbu, A., Bogoni, L., Comaniciu, D.: Probabilistic 3D polyp detection in CT images: The role of sample alignment. In: CVPR (2006)" is used and separate classifiers are trained for different types of MR acquisitions in an offline training phase as described further below. Using the GMM-EM maps reduces classifier complexity by decreasing the effect of inter-patient intensity inhomogeneities and thus reduces classifier overfitting.

For increased speed, in one embodiment of the present invention a low-resolution boosting classifier is first applied followed by a high-resolution classifier on the high-probability regions identified by the low-resolution classifier.

Random Walker Segmentation

Given a set of foreground (FG) and background (BG) seeds and weights corresponding to intensity similarities between neighboring voxels, the random walker (RW) segmentation method as described in "[8]. Grady, L.: Random walks for image segmentation. IEEE Pattern Analysis and Machine Intelligence 28(11), 1768-1783 (2006)" and which is incorporated herein by reference computes a map indicating the probability that a RW starting from each voxel would encounter an FG seed first. By thresholding this probability map, one can obtain the foreground segmentation. In one embodiment of the present invention the neighborhood similarities using the intensity-corrected MR image are computed rather than the original. Details regarding these steps are given below.

Seeding

In one embodiment of the present invention a mean prostate shape in an offline training phase, is built from a database as described in further below in the form of a signed distance map. Based upon the maximum and minimum prostate volumes mentioned below, inner and outer thresholds on this distance map and the corresponding inner and outer masks are derived in accordance with an aspect of the present invention so that these mask volumes are greater or smaller than the maximum and minimum volumes by about 10%, respectively. These inner and outer masks obtained in the offline phase are then centered at the previously detected prostate center in order to obtain an initial estimate of the FG and BG seeds. For SPACE images, in conjunction with the probability threshold computation described below, these initial FG/BG estimates lead to sufficient accuracy. However, for the more challenging case of non-isotropic TSE images, the FB/BG estimates are refined using the boundaries of the left/right muscles and rectum identified by GMM-EM.

First the FG seeds are expanded towards these boundaries on each slice simply by adding seeds on each horizontal scan-line intersecting the left/right muscles and each vertical scan-line intersecting the rectum. There may be fat layers around the prostate, e.g., between the outer PZ boundary and the left muscle. Therefore, a 20% offset is kept between the FG seeds and the left/right muscle boundaries and a 40% offset between the FG seeds and the rectum boundary. Then the convex hull of all FG seeds is computed. The volume enclosed by the hull is computed as described in "[3]. Dobkin, D., Kirkpatrick, D.: Determining the separation of preprocessed polyhedral—a unified approach. Automata, Languages and Programming 443, 400-413 (1990)" and forms the new FG seeds estimate.

Since the ER coil can introduce a concavity, any FG seeds intersecting the low-intensity rectum are removed. The BG seeds are then refined using this new estimate of the FG seeds as follows: the mean distance map is reconsidered and the smallest value for the FG seeds is computed. New BG seeds are added when the distance is lower than this smallest value by a 4 mm offset.

Intensity Correction

The voxels affected by the ER-coil near-field effect (ER-voxels) are spatially close and belong to the high-intensity cluster in the 3-component map found by GMM-EM. Unless these high-intensities are corrected, RW is often unable to cross the high-intensity barrier and capture the entire PZ.

Occasionally, the bladder also belongs to this high-intensity component, but it can be easily separated from this cluster by spatial connected component analysis.

Given the mean $\mu_h$ and std. dev. $\sigma_h$ for these ER-voxels, their std. dev. is made equal to that of the middle-intensity component ($\sigma_m$) and the mean equal to the small middle-intensity mean ($\mu_m$) plus a small constant $\epsilon$ (proportional to $\sigma_h$). If $\upsilon_{old}$ and $\upsilon_{new}$ denote the un-corrected and corrected intensities for an ER-voxel, then the corresponding linear intensity transformation can be expressed as:

$$\upsilon_{new} = \mu_m + \epsilon + \frac{\sigma_m}{\sigma_h}(\upsilon_{old} - \mu_h) \quad (1)$$

Figure 4:
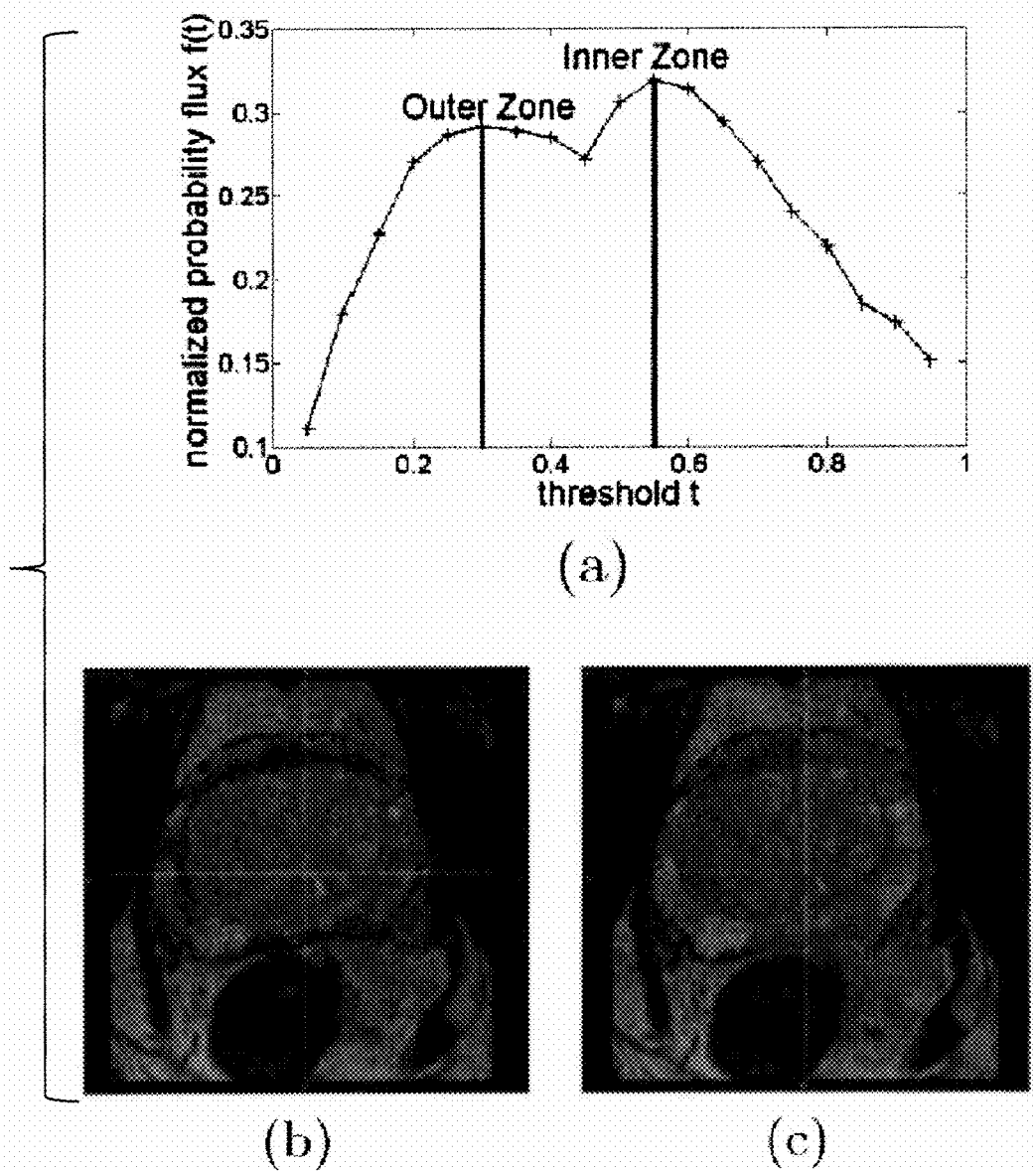
FIG. 4 illustrates probability threshold computation in accordance with an aspect of the present invention.

The effect of this correction is shown in FIG. 4. FIG. 4 illustrates RW probability threshold computation for SPACE images wherein FIG. 4(a) illustrates a normalized flux profile FIG. 4(b) illustrates an inner zone (0.55 threshold) and FIG. 4(c) illustrates an outer zone (0.3 threshold).

Adding $\epsilon$ leads to visually pleasing intensity correction, however setting this constant to zero creates improved segmentation metrics. Accordingly, $\epsilon$ can be 0 or any other arbitrary value, which is preferably proportional to $\sigma_h$.

Probability Threshold Computation

The conventional RW algorithm may use a probability threshold of 0.5. In accordance with various aspects of the present invention two different techniques are provided for threshold computation in the SPACE and TSE images in order to capture the PZ. The normalized flux of the probability map's gradient (using the divergence theorem) is computed as a function of the threshold. If p(x, y, z) denotes the probability map and $S_A(t)$ denotes the surface area of the binary mask obtained at threshold t, then the normalized flux is given by:

$$f(t) = \frac{1}{S_A(t)} \int_{p(x,y,z) \geq t} \nabla^2 p(x, y, z) \, dx \, dy \, dz \quad (2)$$

A local maximum of this flux corresponds to a sharp boundary. For SPACE images, on account of the isotropic voxels and optimized contrast, two clear peaks can be observed corresponding to the inner and outer boundary of the peripheral zone as seen in FIG. 4(a) when a clear PZ is present.

It is noted that in (2), normalizing by the surface area in the denominator, and not the volume, gives the average probability gradient over the surface. Note that the numerator is a surface integral over the probability gradient converted into a volume integral over the probability Laplacian.

Normalizing by the volume actually gives worse results since the local maxima of this alternative normalized flux do not correspond to the inner and outer zones. However, for non-isotropic TSE images, even with a surface area normalization, one occasionally sees a single normalized flux peak corresponding to a boundary that shifts between the inner and outer zone. Therefore, in accordance with an aspect of the present invention, the probability threshold is set equal to the maximum of the product of the normalized flux and volume in order to shift the peak towards the outer zone.

Shape Model Constraints

Since the RW algorithm might result in small undesirable wiggles in the segmentation output (please see FIG. 4), the RW segmentations distance map is projected into shape-space as described in [17]. Tsai. A., Yezzi, A., Wells, W., Tempany, C., Tucker, D., Fan, A., Grimson, W., Willsky, A.: A shape-based approach to the segmentation of medical imagery using level sets. TMI 22(2), 137-154 (2003)." However, this projection might over-constrain the segmentation result. So, in accordance with an aspect of the present invention, the original distance map (computed using the fast marching method, as in [17]. Tsai, A., Yezzi, A., Wells, W., Tempany, C., Tucker, D., Fan, A., Grimson, W., Willsky, A.: A shape-based approach to the segmentation of medical imagery using level sets. TMI 22(2), 137-154 (2003)") is blended with its projected version by convex linear combination using a blending factor of 0.25 weighting the projected version.

Although this convex linear combination is not guaranteed to yield a valid binary segmentation, excellent results were obtained with this technique. Imposing these shape model constraints does not significantly affect the segmentation error metrics as measured in experiments related to aspects of the present invention, but merely serves to improve the visual appearance of the segmentation.

Saturation Band Computation for Chemical Shift Spectroscopy

Given the segmentation output, its triangulated convex hull is first computed as described in "[3]. Dobkin, D., Kirkpatrick, D.: Determining the separation of preprocessed polyhedral—a unified approach. Automata, Languages and Programming 443, 400-413 (1990)." Since 8 or 16 planes for the saturation bands are required, intersections are obtained of 8 or 16 spherically symmetric direction vectors with the convex hull and then saturation bands are picked corresponding to the triangles of intersection.

Results and Discussion

The methods provided herein in accordance with various aspects of the present invention have been evaluated on a set of 23 3 T T2-SPACE (typical dimensions: 320×320×88, resolution: 0.75 mm×0.75 mm×0.9 mm) patient images, 53 axially oriented 3 T T2-TSE (typical dimensions: 320×320×28, resolution: 0.7 mm×0.7 mm×3.3 mm) non-isotropic acquisitions (which included the 23 SPACE patients but with slightly different segmentations on account of bladder movement) and 58 1.5 T axially oriented T2-TSE non-isotropic acquisitions.

These three acquisitions are characterized by unique contrasts and hence 3 separate prostate-center classifiers were trained. ER coils were used in about 90% of the total acquisitions. The shape model was obtained using principal component analysis as described in "[17]. Tsai, A., Yezzi, A., Wells, W., Tempany, C., Tucker, D., Fan, A., Grimson, W., Willsky, A.: A shape-based approach to the segmentation of medical imagery using level sets. TMI 22(2), 137-154

(2003)" from the SPACE images since they adequately capture the spatial variation needed to eliminate the wiggles as described earlier.

The minimum and maximum prostate volumes in the database were 18 ml and 158 ml (a case of benign prostatic hyperplasia) respectively. The segmentation error metrics are given in the table provided below.

The center-point error represents the error from boosting-based center detection and volumetric difference is the absolute difference between volumes corresponding to the expert-labeled ground truth G and the automatic segmentation S. The inner (outer) surface error is the average distance from the border voxels of S inside (outside) G to the closest border voxel in G. The last column is the average symmetric surface error defined in "[6]. van Ginneken, B., Heimann, T., Styner, M.: 3D segmentation in the clinic: A grand challenge. In: MICCAI Wshp. 3D Segmentation in the Clinic (2007)."

It is noted that of the error metrics considered in the provided table, the average symmetric surface error as described by "[6]. van Ginneken, B., Heimann, T., Styner, M.: 3D segmentation in the clinic: A grand challenge. In: MICCAI Wshp. 3D Segmentation in the Clinic (2007)" is a commonly employed segmentation evaluation measure. However, reporting internal and external surface errors as minimizing internal error is preferred in application of placing saturation bands in accordance with an aspect of the present invention. The volumetric difference in milliliters is an important segmentation error metric for other applications such as pharmacokinetic modeling as described in "[5]. Franiel, T., Ludemann, L., Rudolph, B., Rehbein, H., Stephan, C., Taupitz, M., Beyersdorff, D.: Prostate MR imaging: Tissue characterization with pharmacokinetic volume and blood flow parameters and correlation with histologic parameters. Radiology 252 (1), 101-108 (2009)."

The following table illustrates segmentation errors. Results in rows 1-3 present errors on training sets used for the boosting classifiers and the result in row 4 presents errors on an independent unseen test set.

also provided. The fourth row represents the error on an unseen test set of 20 3 T TSE non-isotropic acquisitions with the center of the image selected as the initial prostate center estimate (the results in the first three rows are unaffected by this initial seed estimate). Note that the symmetric surface error on this test set is only marginally higher than that of the training set although the center-point error is much higher.

The Dice coefficients (a commonly used segmentation error metric employed for MR prostate segmentation evaluation in "[9]. Klein, S., van der Heide, U. A., Lips, I., van Vulpen, M., Maes, F., Staring, M., Pluim, J.: Automatic segmentation of the prostate in 3D MR images by atlas matching using localized mutual information. Medical Physics 35(4), 1407-1417 (2008)") corresponding to rows 1-4 had the mean and standard deviation values: 0.86±0.04, 0.82±0.09, 0.82±0.07 and 0.82±0.12, respectively. These values are comparable to those reported in "[9]. Klein, S., van der Heide, U. A., Lips, I., van Vulpen, M., Maes, F., Staring, M., Pluim, J.: Automatic segmentation of the prostate in 3D MR images by atlas matching using localized mutual information. Medical Physics 35(4), 1407-1417 (2008)," although the dataset that is applied as an aspect of the present invention has considerably greater variability on account of the reasons discussed earlier.

The methods as provided herein are, in one embodiment of the present invention, implemented on a system or a computer device or a plurality of computer devices. A system illustrated in FIG. 5 and as provided herein is enabled for receiving, processing and generating data. The system is provided with data that can be stored on a memory 1801. Data may be obtained from a scanning machine such as an MRI (Magnetic Resonance Imaging) machine or may be provided from a data source. Data may be provided on an input 1806. The processor is also provided or programmed with an instruction set or program executing the methods of the present invention that is stored on a memory 1802 and is provided to the processor 1803, which executes the instructions of 1802 to process the

TABLE

| Acquisition Type | Center point error (mm) | Volumetric difference (ml) | Inner surface error (mm) | Outer surface error (mm) | Symmetric surface error (mm) |
|---|---|---|---|---|---|
| 3T SPACE (23 patients) | 0.4 ± 0.4 | 9.7 ± 6.9 | 0.87 ± 0.5 | 2.4 ± 0.8 | 1.6 ± 0.5 |
| 3T TSE (33 patients) | 0.6 ± 0.7 | 15.5 ± 12.9 | 0.77 ± 0.5 | 3.6 ± 1.6 | 2.3 ± 1.2 |
| 1.5T TSE (58 patients) | 1.1 ± 2.0 | 17.6 ± 12.2 | 0.93 ± 0.8 | 3.4 ± 1.5 | 2.4 ± 1.1 |
| 3T TSE (20 unseen) | 6.3 ± 3.9 | 21.5 ± 19.0 | 0.60 ± 0.7 | 3.9 ± 3.0 | 2.5 ± 2.1 |

The 3 T non-isotropic TSE dataset was divided into two sets of 33 and 20 images. The first three rows correspond to training sets used with the boosting classifiers for the 3 acquisition types and hence represent the segmentation outputs using near-perfect center initializations. Moreover, the various parameters in the algorithm (center detection: parameters for low-resolution and high-resolution classifiers, probability threshold use to select region for high-resolution classifier, seeding: initial shrinking/expansion parameters and offsets to left muscle, etc., intensity correction: constant added to mean, shape-space projection: number of modes, blending factor) were optimized to obtain good results in rows 1 and 2.

Figure 5:
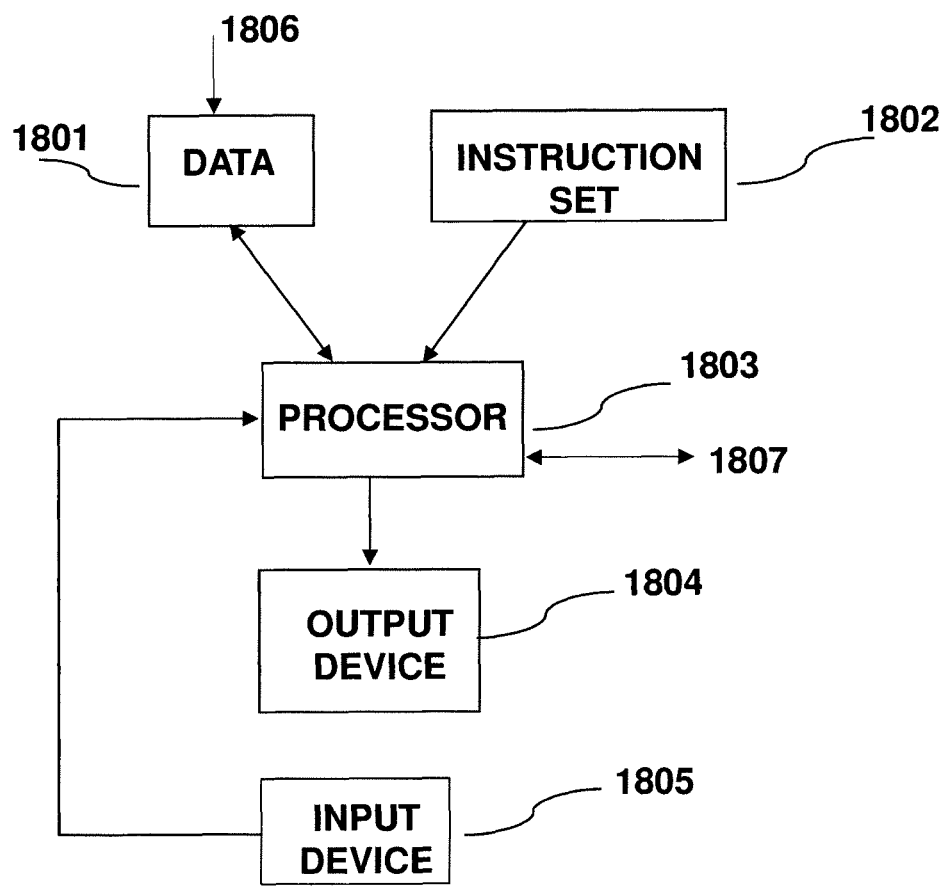
FIG. 5 illustrates a system in accordance with an aspect of the present invention.

The results in rows 1-3 are regarded as results on training sets and therefore, an independent evaluation on a test set is data from 1801. Data, such as a segmentation image or any other signal resulting from the processor can be outputted on an output device 1804, which may be a display to display data or a data storage device. The processor also has a communication channel 1807 to receive external data from a communication device and to transmit data to an external device. The system in one embodiment of the present invention has an input device 1805, which may be a keyboard, a mouse or any other device that can generated data to be provided to processor 1803. The processor can be dedicated hardware. However, the processor can also be a CPU or any other computing device that can execute the instructions of 1802. Accordingly, the system as illustrated in FIG. 5 provides a system for data processing resulting from an imaging device or any other data source and is enabled to execute the steps of the methods as provided herein as one or more aspects of the present invention.

In summary methods and systems for implementing an accurate automatic prostate segmentation technique for T2 MR images of patients have been provided herein and it has been shown how it can facilitate improved 3D chemical shift spectroscopic imaging with accurate saturation band placement as described in "[14]. Scheenen, T., Heijmink, S., Roell, S., de Kaa, C. H., Knipscheer, B., Witjes, J., Barentsz, J., Heerschap, A.: Three-dimensional proton MR spectroscopy of human prostate at 3 T without endorectal coil. Radiology 245(2), 507-516 (2007)." These methods and systems are intended to be applied in a medical or a clinical setting, for instance in a hospital or a medical practice. The segmented images are obtained by an operator. The segmented images are evaluated by a specialist such as a medical doctor or a medical specialist such as a urologist or a radiologist.

The known process of placing saturation bands is manual, time-consuming and can lead to sub-optimal images for inexperienced operators. The automatic segmentation methods and systems as provided herein in accordance with various aspects of the present invention serve an important clinical need by automating this process and thus reducing the burden on the operator. It could also enable advanced analysis techniques such as pharmacokinetic modeling from DCE-MRI as described in "[5]. Franiel, T., Ludemann, L., Rudolph, B., Rehbein, H., Stephan, C., Taupitz, M., Beyersdorff, D.: Prostate M R imaging: Tissue characterization with pharmacokinetic volume and blood flow parameters and correlation with histologic parameters. Radiology 252(1), 101-108 (2009)."

Besides enabling advanced cancer imaging and computer-aided diagnosis techniques, the automated system provided herein can be applied to other applications such as radiotherapy planning and drug therapy assessment. Note that some of the methods provided herein in accordance with one or more aspects of the present invention in order to capture the PZ via the RW algorithm, viz., boosting-based centering, initialization via left/right muscle detection and intensity correction can be readily incorporated into level set segmentation techniques employing a shape model as described in "[17]. Tsai, A., Yezzi, A., Wells, W., Tempany, C., Tucker, D., Fan, A., Grimson, W., Willsky, A.: A shape-based approach to the segmentation of medical imagery using level sets. TMI 22(2), 137-154 (2003)" as well.

The term voxel is used herein to indicate an image data element, which may have one or more values. A voxel herein is intended to mean the same as pixel. The term voxel indicates that it is a pixel in 3D space.

The following references are generally descriptive of the background of the present invention and are hereby incorporated herein by reference: [1]. Betrouni, N., Puech, P., Dewalle, A., Lopes, R., Dubois, P., Vermandel, M.: 3D automatic segmentation and reconstruction of prostate on MR images. In: IEEE EMBS Conf. (2007); [2]. Bishop, C.: Pattern Recognition and Machine Learning. Springer, Heidelberg (2006); [3]. Dobkin, D., Kirkpatrick, D.: Determining the separation of preprocessed polyhedral—a unified approach. Automata, Languages and Programming 443, 400-413 (1990); [4]. Flores-Tapia, D., Thomas, G., Venugopal, N., McCurdy, B., Pistorius, S.: Semiautomatic MRI prostate segmentation based on wavelet multiscale products. In: IEEE EMBS Conf. (2008); [5]. Franiel, T., Ludemann, L., Rudolph, B., Rehbein, H., Stephan, C., Taupitz, M., Beyersdorff, D.: Prostate MR imaging: Tissue characterization with pharmacokinetic volume and blood flow parameters and correlation with histologic parameters. Radiology 252(1), 101-108 (2009); [6]. van Ginneken, B., Heimann, T., Styner, M.: 3D segmentation in the clinic: A grand challenge. In: MICCAI Wshp. 3D Segmentation in the Clinic (2007); [7]. Gong, L., Pathak, S., Haynor, D., Cho, P., Kim, Y.: Parametric shape modeling using deformable superellipses for prostate segmentation. TMI 23(3) (2004); [8]. Grady, L.: Random walks for image segmentation. IEEE Pattern Analysis and Machine Intelligence 28(11), 1768-1783 (2006); [9]. Klein, S., van der Heide, U. A., Lips, I., van Vulpen, M., Maes, F., Staring, M., Pluim, J.: Automatic segmentation of the prostate in 3D MR images by atlas matching using localized mutual information. Medical Physics 35(4), 1407-1417 (2008); [10]. Leemput, K. V., Maes, F., Vandermeulen, D., Suetens, P.: Automated model-based bias field correction of MR images of the brain. TMI 18(10), 885-896 (2003); [11]. Liu, X., Langer, D. L., Haider, M. A., der Kwast, T. H. V., Evans, A. J., Wernick, M. N., Yetik, I. S.: Unsupervised segmentation of the prostate using MR images based on level set with a shape prior. In: IEEE EMBS Conf. (2009); [12]. Rousson, M., Khamene, A., Diallo, M. H., Celi, J. C., Sauer, F.: Constrained surface evolutions for prostate and bladder segmentation in CT images. In: Liu, Y., Jiang, T.-Z., Zhang, C. (eds.) CVBIA 2005. LNCS, vol. 3765, pp. 251-260. Springer, Heidelberg (2005); [13]. Samiee, M., Thomas, G., Fazel-Rezai, R.: Semi-automatic prostate segmentation of MR images based on flow orientation. In: IEEE International Symposium on Signal Processing and Information Technology (2006); [14]. Scheenen, T., Heijmink, S., Roell, S., de Kaa, C. H., Knipscheer, B., Witjes, J., Barentsz, J., Heerschap, A.: Three-dimensional proton MR spectroscopy of human prostate at 3 T without endorectal coil. Radiology 245(2), 507-516 (2007); [15]. Toth, R., Chappelow, Rosen, M. A., Pungavkar, S., Kalyanpur, A., Madabhushi, A.: Multi-attribute non-initializing texture reconstruction based active shape model (MANTRA). In: Metaxas, D., Axel, L., Fichtinger, G., Székely, G. (eds.) MICCAI 2008, Part I. LNCS, vol. 5241, pp. 653-661. Springer, Heidelberg (2008); [16]. Toth, R., Tiwari, P., Rosen, M., Reed, G., Kurhanewicz, J., Kalyanpur, A., Pungavkar, S., Madabhushi, A.: A magnetic resonance spectroscopy driven initialization scheme for active shape model based prostate segmentation. Medical Image Analysis 15, 214-225 (2011); [17]. Tsai, A., Yezzi, A., Wells, W., Tempany, C., Tucker, D., Fan, A., Grimson, W., Willsky, A.: A shape-based approach to the segmentation of medical imagery using level sets. TMI 22(2), 137-154 (2003); [18]. Tu, Z., Zhou, X., Barbu, A., Bogoni, L., Comaniciu, D.: Probabilistic 3D polyp detection in CT images: The role of sample alignment. In: CVPR (2006); [19]. Turkbey, B., Pinto, P., Choyke, P. L.: Imaging techniques for prostate cancer: implications for focal therapy. Nature Reviews: Urology 6, 191-203 (2009); [20]. Viola, P., Jones, M.: Robust real-time face detection. Int. J. Comp. Vision 57(2), 137-154 (2004); and [21]. D. Singaraju, L. Grady and R. Vidal, Interactive Image Segmentation Via Minimization of Quadratic Energies on Directed Graph, Proc. IEEE Conf. on Computer Vision and Pattern Recognition, June, 2008.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for segmenting a prostate in Magnetic Resonance Image (MRI) data, comprising:
   a processor learning a boosting classifier from a plurality of Magnetic Resonance (MR) images;
   the processor determining a center of the prostate by applying the boosting classifier;
   the processor applying an intensity correction to suppress an image artifact;
   the processor determining a foreground seed and a background seed of the prostate based on a shape model of the prostate;
   the processor applying a Random Walker segmentation method to the image data based on the foreground and background seed to generate a segmentation of the prostate; and
   determining a probability threshold for the Random Walker segmentation method that maximizes a capture of a peripheral zone (PZ) in the segmentation of the prostate.

2. A method for segmenting a prostate in Magnetic Resonance Image (MRI) data, comprising:
   a processor learning a boosting classifier from a plurality of Magnetic Resonance (MR) images;
   the processor determining a center of the prostate by applying the boosting classifier;
   the processor applying an intensity correction to suppress an image artifact;
   the processor determining a foreground seed and a background seed of the prostate based on a shape model of the prostate; and
   the processor applying a segmentation method to the image data based on the foreground and background seed to generate a segmentation of the prostate, wherein the foreground seed and the background seed are determined based on a GMM-EM segmentation of left and right prostate muscles and a rectum.

3. The method of claim 1, wherein the boosted classifier is trained on intensity-based multi-level Gaussian Mixture Model Expectation Maximization (GMM-EM) segmentations of MR images of a prostate.

4. The method of claim 1, further comprising:
   the processor determining a signed distance map as a mean prostate shape from a plurality of prostate images.

5. The method of claim 1, wherein the foreground seed and the background seed are determined based on a GMM-EM segmentation of left and right prostate muscles and a rectum.

6. The method of claim 1, wherein the image artifact is created by an endorectal (ER) coil.

7. The method of claim 1, wherein the intensity correction is an intensity transformation of a high-intensity cluster by the processor.

8. The method of claim 7, wherein the intensity transformation is expressed as:

$$v_{new} = \mu_m + \epsilon + \frac{\sigma_m}{\sigma_h}(v_{old} - \mu_h),$$

wherein
  $v_{new}$ is a corrected intensity of a voxel;
  $v_{old}$ is an uncorrected intensity of a voxel;
  $\mu_m$ is a middle-intensity mean;
  $\epsilon$ is an arbitrary constant;
  $\sigma_m$ is a standard deviation of a middle-intensity component;
  $\sigma_h$ is a standard deviation of a high-intensity component; and
  $\mu_h$ is a high-intensity mean.

9. The method as claimed in claim 1, wherein the threshold for the Random Walker segmentation is determined from a maximum in a normalized flux.

10. A system to segment a prostate in Magnetic Resonance Image (MRI) data, comprising:
    memory enabled to store data;
    a processor enabled to execute instructions to perform the steps:
      learning a boosting classifier from a plurality of Magnetic Resonance (MR) images;
      determining a center of the prostate by applying the boosting classifier;
      applying an intensity correction to suppress an image artifact;
      determining a foreground seed and a background seed of the prostate based on a shape model of the prostate;
      applying a Random Walker segmentation method to the image data based on the foreground and background seed to generate a segmentation of the prostate; and
      determining a probability threshold for the Random Walker segmentation method that maximizes a capture of a peripheral zone (PZ) in the segmentation of the prostate.

11. The system of claim 10, wherein the boosted classifier is trained on intensity corrected Magnetic Resonance (MR) images of a prostate.

12. The system of claim 10, further comprising:
    the processor being enabled to determine a signed distance map as a mean prostate shape from a plurality of prostate images.

13. The system of claim 10, wherein the foreground seed and the background seed are determined based on a GMM-EM segmentation of left and right prostate muscles and a rectum.

14. The system of claim 10, wherein the image artifact is created by an endorectal (ER) coil.

15. The system of claim 10, wherein the intensity correction is an intensity transformation of a high-intensity cluster by the processor.

16. The system of claim 15, wherein the intensity transformation is expressed as:

$$v_{new} = \mu_m + \epsilon + \frac{\sigma_m}{\sigma_h}(v_{old} - \mu_h),$$

wherein
  $v_{new}$ is a corrected intensity of a voxel;
  $v_{old}$ is an uncorrected intensity of a voxel;
  $\mu_m$ is a middle-intensity mean;
  $\epsilon$ is an arbitrary constant;
  $\sigma_m$ is a standard deviation of a middle-intensity component;
  $\sigma_h$ is a standard deviation of a high-intensity component; and
  $\mu_h$ is a high-intensity mean.

17. The system of claim 10, wherein the threshold for the Random Walker segmentation is determined from a maximum in a normalized flux.

* * * * *